United States Patent
Palm

(10) Patent No.: US 10,030,293 B2
(45) Date of Patent: Jul. 24, 2018

(54) ALUMINUM MATERIAL HAVING IMPROVED PRECIPITATION HARDENING

(71) Applicant: Airbus Defence and Space GmbH, Ottobrunn (DE)

(72) Inventor: Frank Palm, Unterhaching (DE)

(73) Assignee: Airbus Defence and Space GmbH, Ottobrunn (DE)

(*) Notice: Subject to any disclaimer, the term of this patent is extended or adjusted under 35 U.S.C. 154(b) by 767 days.

(21) Appl. No.: 14/338,652

(22) Filed: Jul. 23, 2014

(65) Prior Publication Data

US 2015/0027595 A1 Jan. 29, 2015

(30) Foreign Application Priority Data

Jul. 24, 2013 (DE) .................. 10 2013 012 259

(51) Int. Cl.

| | |
|---|---|
| *C22C 21/00* | (2006.01) |
| *C22F 1/04* | (2006.01) |
| *C22C 1/03* | (2006.01) |
| *C22F 1/02* | (2006.01) |
| *B22F 1/00* | (2006.01) |
| *B61D 17/04* | (2006.01) |
| *B64C 1/00* | (2006.01) |
| *B22F 3/15* | (2006.01) |
| *B22F 9/04* | (2006.01) |
| *C22C 1/04* | (2006.01) |

(52) U.S. Cl.
CPC .................. *C22F 1/04* (2013.01); *C22C 1/03* (2013.01); *C22C 21/00* (2013.01); *C22F 1/02* (2013.01); *B22F 1/00* (2013.01); *B22F 1/0085* (2013.01); *B22F 3/15* (2013.01); *B22F 9/04* (2013.01); *B22F 2998/10* (2013.01); *B61D 17/041* (2013.01); *B63B 2231/10* (2013.01); *B64C 2001/0081* (2013.01); *C22C 1/0416* (2013.01)

(58) Field of Classification Search
CPC .............. C22C 1/03; C22C 21/00; C22F 1/04
See application file for complete search history.

(56) References Cited

U.S. PATENT DOCUMENTS

| | | | |
|---|---|---|---|
| 3,619,181 | A | 11/1971 | Willey |
| 7,550,110 | B2 | 6/2009 | Warner et al. |
| 2004/0055671 | A1 | 3/2004 | Olson et al. |
| 2005/0072497 | A1 | 4/2005 | Eberl et al. |
| 2007/0240796 | A1 | 10/2007 | Koch et al. |

(Continued)

FOREIGN PATENT DOCUMENTS

| | | |
|---|---|---|
| CN | 101880802 A | 11/2010 |
| DE | 103 52 932 A1 | 6/2005 |

(Continued)

OTHER PUBLICATIONS

German Office Action dated Feb. 28, 2014 (five (5) pages).
Dalen et al., "Effects of Yb and Zr microalloying additions on the microstructure and mechanical properties of dilute Al-Sc alloys," 2011, pp. 7615-7626, vol. 59, Elsevier.
European Search Report dated Dec. 12, 2014, with partial English translation (Seven (7) pages).
Johnson, Nicholas D: "Processing and mechanical properties of cast aluminum containing scandium, zirconium, and ytterbium", Master's Thesis, Michigan Technological University, Sep. 1, 2011, XP002733008 (seventy three (73) pages).

(Continued)

*Primary Examiner* — George Wyszomierski
*Assistant Examiner* — Janelle Morillo
(74) *Attorney, Agent, or Firm* — Crowell & Moring LLP

(57) ABSTRACT

An aluminum material for producing light-weight components includes aluminum (Al), scandium (Sc), zirconium (Zr) and ytterbium (Yb), where a weight ratio of scandium (Sc) to zirconium (Zr) to ytterbium (Yb) [Sc/Zr/Yb] is in a range from 10/5/2.5 to 10/2.5/1.25.

10 Claims, 2 Drawing Sheets

(56) References Cited

U.S. PATENT DOCUMENTS

Figure 1:
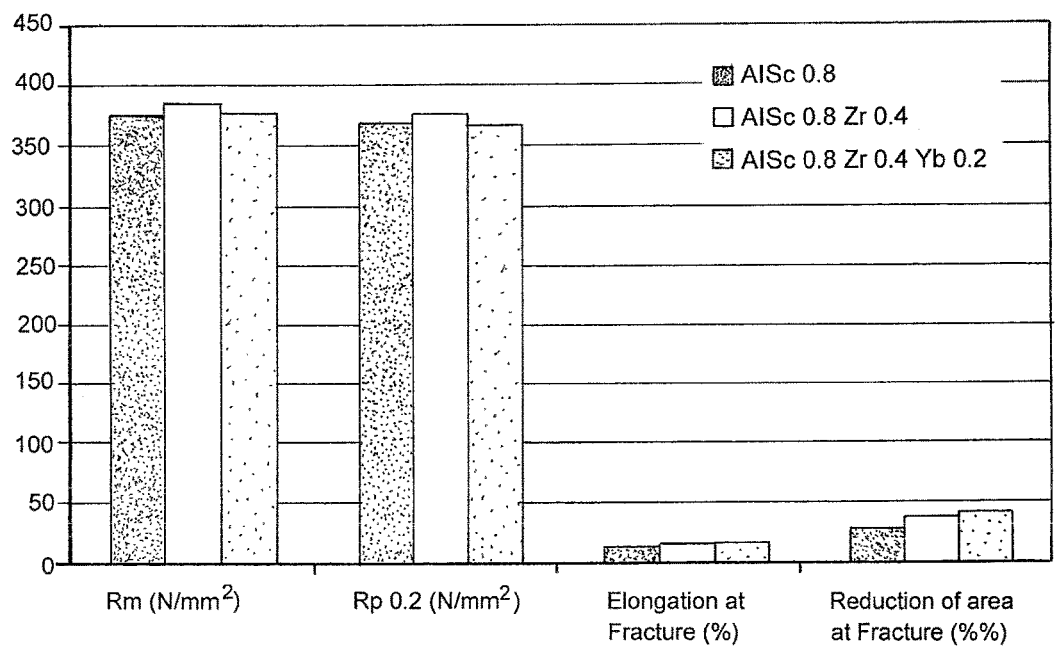

2009/0263275 A1    10/2009  Pandey
2009/0269613 A1*   10/2009  Zhao .................. B22D 11/003
                                                           428/687
2010/0170996 A1*    7/2010  Sankaran ............... C22C 21/06
                                                           244/133

FOREIGN PATENT DOCUMENTS

| DE | 10 2007 018 123 A1 | 10/2008 |
| EP | 1 111 078 A2 | 6/2001 |
| EP | 2 112 243 A1 | 10/2009 |
| JP | 9-95750 A | 4/1997 |
| WO | WO 02/44433 A1 | 6/2002 |
| WO | WO 03/085145 A2 | 10/2003 |

OTHER PUBLICATIONS

Karnesky R A et al: "Effects of substituting rare-earth elements for scandium in a precipitation-strengthened Al-0.08at. %Sc alloy", Scripta Materialia, Elsevier, Amsterdam, NL, vol. 55, No. 5, Sep. 1, 2006, pp. 437-440, XP027890380, (Four (4) pages).
Chinese Office Action issued in Chinese counterpart application No. 201410355158.0 dated Mar. 8, 2017 (Seven (7) pages).
Second Chinese Office Action issued in Chinese counterpart application No. 201410355158.0 dated Sep. 15, 2017, with English translation (Sixteen (16) pages).
Chinese Office Action issued in Chinese counterpart application No. 201410355158.0 dated May 3, 2018, with partial English translation (Seven (7) pages).

\* cited by examiner

ALUMINUM MATERIAL HAVING IMPROVED PRECIPITATION HARDENING

CROSS-REFERENCE TO RELATED APPLICATIONS

This application claims priority under 35 U.S.C. § 119 to German patent application number 10 2013 012 259.7, filed Jul. 24, 2013, the entire disclosure of which is herein expressly incorporated by reference.

FIELD OF THE INVENTION

Exemplary embodiments of the present invention relate to an aluminum material for producing light-weight components, to a method for producing such an aluminum material, and to the use of such an aluminum material as a structural component or a passenger compartment component in a passenger transportation vehicle.

BACKGROUND OF THE INVENTION

Aluminum alloys are frequently used to produce light-weight components, such as structural components or passenger compartment components in passenger transportation vehicles such as aircraft, rail-borne vehicles or watercraft. In these applications, aluminum alloys are typically melted and then transformed into a target component using modern primary shaping methods, such as casting methods, for example die casting, sand casting or permanent mold casting methods or thixocasting or rheocasting, but also by way of traditional methods based on machining suitable semi-finished products (subtractive methods), or increasingly by way of direct product generation methods (additive methods). Direct product generation methods are considered to be those methods that are used to produce parts directly, "in a straightforward manner," which is to say without further thermomechanical process steps, and in the desired final contour and that result in components having load-bearing capacities in such a way that they can assume the mechanical-technological functions of "normally" produced components, which is to say components that are produced in the standard manner. After the thus directly generated aluminum material has solidified, the target component has a cast structure having special strength properties and residual component stresses defined by the alloy chemistry and cooling conditions. If the material has solidified sufficiently quickly, the strength and residual component stress of the resulting components can frequently be improved immediately thereafter by way of a precipitation hardening step, which is also referred to as aging. However, such rapid cooling, which is desirable since it creates advantages, is generally prevented or impeded by economically driven process parameters.

Aluminum alloys, in particular aluminum alloys comprising scandium, are known from DE 10 2007 018 123 A1, DE 103 52 932 A1, U.S. Pat. No. 3,619,181 A, EP 0 238 550 A, EP 1 111 078 A2 or DE 100 248 594 A1, for example. While, in principle, simultaneously adding scandium (Sc) and zirconium (Zr) to aluminum alloys is considered to particularly increase strength, this addition generally results in the formation of intermetallic dispersoids of the type Al3X (metalphysically also referred to as L12, DO22 and DO23 phases due to the stoichiometry thereof) which are no longer coherent, due to the size thereof of >50 nm, due to delayed solidification conditions. Given the low solubility of Sc and Zr in the aluminum material at room temperature, insufficiently rapid solidification of these AlSc or AlScZr alloys results in the premature, above-described undesirable phase formation, and thus in worsening of the achievable material properties, in particular in lower strength. The negative base material properties established thereby cannot be corrected by way of conventional heat post-treatment, such as solution heat treatment and precipitation hardening.

SUMMARY OF THE INVENTION

It would thus be desirable to provide a modified aluminum material that is alloyed with scandium and zirconium and has no or, compared to conventional aluminum materials, a lesser amount of the above-mentioned crystallizing dispersoid phases, and where thus, conversely and as a consequence, the "critical" cooling rate, which is required with direct component generation and during which the undesirable premature formation of these Al3X phases is suppressed or at least minimized, is sufficiently small.

Therefore, exemplary embodiments of the present invention provide an aluminum material for producing light-weight components which, compared to conventional aluminum materials, has lower residual component stress and high base material strength. Further, exemplary embodiments of the present invention provide that the aluminum material has high structural hardness and, compared to conventional aluminum materials, can be tempered for a longer period at the same temperature, which is to say has improved, technologically usable precipitation hardening. Additionally, exemplary embodiments of the present invention provide a method for producing such an aluminum material. In particular, this method is to have low manufacturing complexity and minimize the development of residual component stresses, while maximizing strength and precipitation hardening.

Exemplary embodiments of the present invention thus provide an aluminum material for producing light-weight components, the aluminum material comprising aluminum (Al), scandium (Sc), zirconium (Zr) and ytterbium (Yb), wherein the weight ratio of scandium (Sc) to zirconium (Zr) to ytterbium (Yb) [Sc/Zr/Yb] is in a range from 10/5/2.5 to 10/2.5/1.25.

The aluminum material according to the invention is suitable for producing light-weight components. Another advantage is that the aluminum material has high structural hardness and improved precipitation hardening. A further advantage is that components, which were produced from the aluminum material, have low residual component stress and high strength after a defined heat treatment process is carried out.

For example, the material comprises scandium (Sc) in an amount from 0.3 to 1.5% by weight, based on the total weight of the aluminum material.

For example, the material comprises zirconium (Zr) in an amount from 0.075 to 0.75% by weight, based on the total weight of the aluminum material, and/or the material comprises ytterbium (Yb) in an amount from 0.0375 to 0.375% by weight, based on the total weight of the aluminum material.

For example, a) at room temperature, the material has a tensile strength and/or yield strength in a range from 350 to 800 MPa, and/or b) after further heat treatment of the material in a temperature range from 300 to 400° C., at room temperature the tensile strength and/or the yield strength is higher than the tensile strength and/or yield strength of the same material that was produced without further heat treatment.

The present invention further provides a method for producing the aluminum material, the method comprising:

a) providing an aluminum (Al)-scandium (Sc)-zirconium (Zr) base alloy, b) adding ytterbium (Yb) to the AlScZr base alloy from step a) to produce a molten aluminum (Al)-scandium(Sc)-zirconium(Zr)-ytterbium (Yb) alloy, c) cooling the molten AlScZrYb alloy obtained in step b) in the temperature interval $T_{liquidus}$ to $T_{350°\ C.}$ at a cooling rate of ≥100 K/sec to produce a solidified AlScZrYb alloy, and d) heat treating the solidified AlScZrYb alloy in a temperature range from 250 to 500° C.

For example, the AlScZr base alloy is obtained by previously adding zirconium (Zr) to an aluminum (Al)-scandium (Sc) base alloy.

For example, an AlScZr base alloy or an AlSc base alloy is used, which comprises at least one further alloying element selected from the group consisting of Mg, Zn, Cu, Mn, Si, Li, Ag in an amount from 0.5 to 10.0% by weight, Ti, Nb, Ta, Hf, Fe, Ni, Co, Cr, V and/or at least one further alloying element selected from the group of lanthanides comprising Y, La, Eu, Nd, Gd, Tb, Dy, Er, Pr and Ce in an amount from 0.05 to 2.0% by weight, based on the total weight of the AlScZr or AlSc base alloy, per element.

For example, the AlScZr base alloy and/or the AlSc base alloy are present a) in powder or wire form, or b) as sintered, cast, rolled or extruded formed parts.

For example, the melting step of the AlScZrYb alloy in step b) is carried out a) by way of a laser beam, an electron beam or an arc, and/or b) by way of a chemical exothermic reaction, and/or c) capacitively, conductively or inductively.

For example, the molten AlScZrYb alloy is cooled in the temperature interval $T_{liquidus}$ to $T_{350°\ C.}$ at a cooling rate of ≥150 K/sec.

The molten AlScZrYb alloy is cooled to room temperature, for example.

The heat treatment of the solidified AlScZrYb alloy is carried out, for example, for a duration from 10 minutes to 100 hours and/or in multiple stages and/or steps.

For example, the heat-treated AlScZrYb alloy is subjected to cooling to room temperature and the cooling rate is ≥10 K/sec.

For example, after the first heat treatment from step d), at least one further heat treatment is carried out a) in air, protective gas or under vacuum in a temperature range from 300 to 400° C. for a duration from 10 minutes to 100 hours and/or in multiple stages and/or steps, or b) by way of hot isostatic pressing in a temperature range from 300 to 400° C. and in a pressure range from 100 to 10000 bar and/or in multiple stages and/or steps.

The present invention also relates to the use of the aluminum material as a structural component or passenger compartment component in a passenger transportation vehicle. Examples include in aircraft such as passenger airplanes, in rail-borne vehicles such as trains, or watercraft such as passenger ships.

BRIEF DESCRIPTION OF THE DRAWING FIGURES

Figure 2:
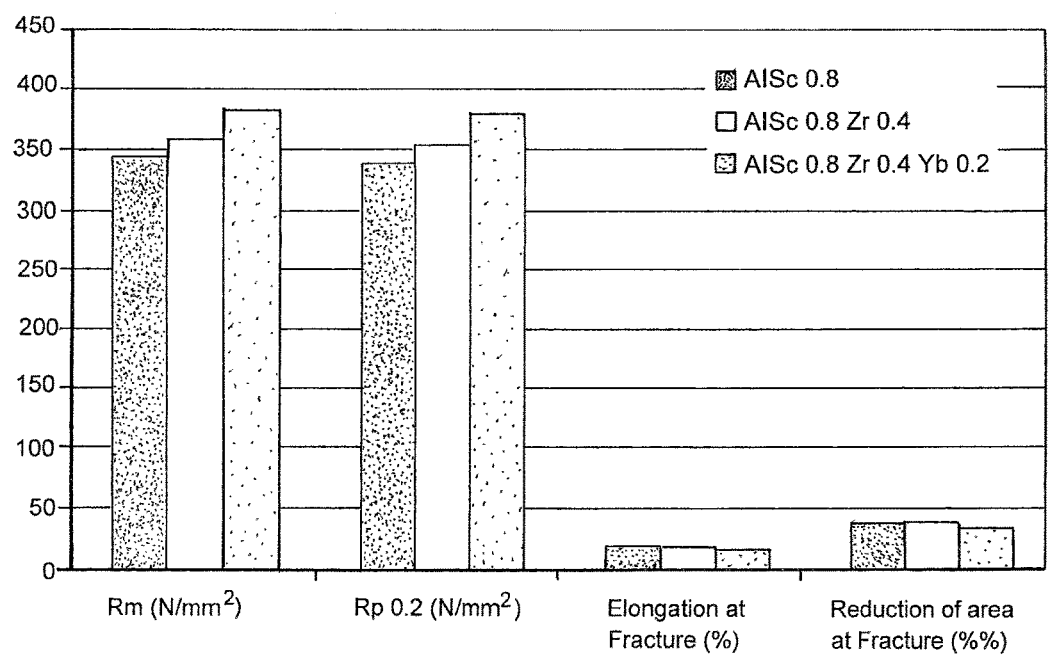
Figure 3:
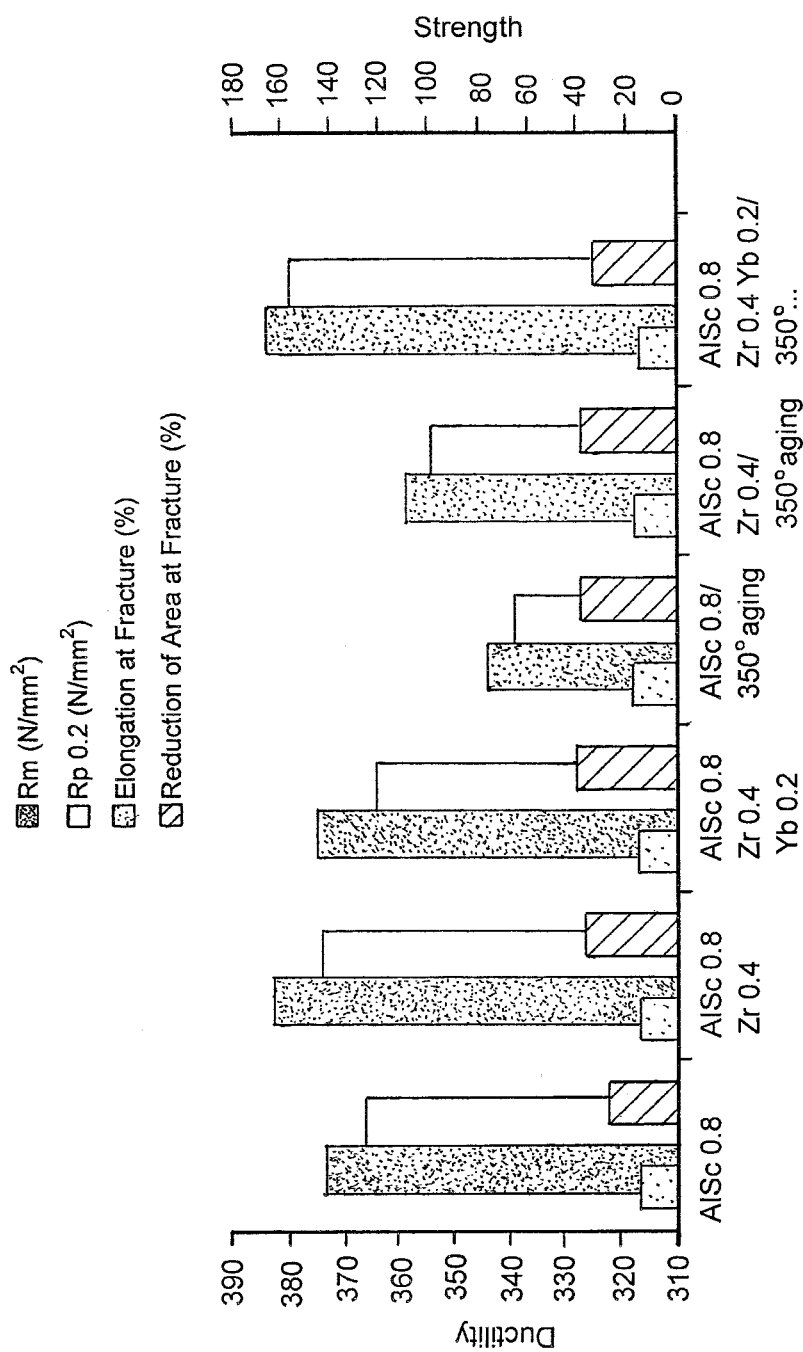

FIGS. 1-3 are graphs illustrating various aspects of aluminum material for producing light-weight components.

DETAILED DESCRIPTION OF THE INVENTION

The present invention relates to an aluminum material for producing light-weight components, the aluminum material comprising aluminum (Al), scandium (Sc), zirconium (Zr) and ytterbium (Yb), wherein the weight ratio of scandium (Sc) to zirconium (Zr) to ytterbium (Yb) [Sc/Zr/Yb] is in a range from 10/5/2.5 to 10/2.5/1.25.

One requirement of the present invention is thus that the aluminum material comprises aluminum (Al), scandium (Sc), zirconium (Zr) and ytterbium (Yb). For example, the aluminum material is composed of aluminum (Al), scandium (Sc), zirconium (Zr) and ytterbium (Yb).

The aluminum material according to the invention is thus an AlScZrYb alloy.

In one embodiment of the present invention, the aluminum material comprises at least one further alloying element selected from the group consisting of Mg, Zn, Cu, Mn, Si, Li, Ag, Ti, Nb Ta, Hf, Fe, Ni, Co, Cr, V and/or at least one further alloying element selected from the group of lanthanides comprising Y, La, Eu, Nd, Gd, Tb, Dy, Er, Pr and Ce. For example, the aluminum material is composed of aluminum (Al), scandium (Sc), zirconium (Zr), ytterbium (Yb) and at least one further alloying element selected from the group consisting of Mg, Zn, Cu, Mn, Si, Li, Ag, Ti, Nb Ta, Hf, Fe, Ni, Co, Cr, V and/or at least one further alloying element selected from the group of lanthanides comprising Y, La, Eu, Nd, Gd, Tb, Dy, Er, Pr and Ce.

The aluminum material according to the invention preferably comprises aluminum (Al), scandium (Sc), zirconium (Zr) and ytterbium (Yb) in a total amount of at least 88.0% by weight, based on the total weight of the aluminum material. For example, the aluminum material preferably comprises aluminum (Al), scandium (Sc), zirconium (Zr) and ytterbium (Yb) in a total amount of at least 89.0% by weight, preferably in a total amount of at least 90.0% by weight, and most preferably in a total amount of at least 91.0% by weight, based on the total weight of the aluminum material. In one embodiment of the present invention, the aluminum material preferably comprises aluminum (Al), scandium (Sc), zirconium (Zr) and ytterbium (Yb) in a total amount of at least 92.0% by weight, preferably in a total amount of at least 94.0% by weight, further preferably in a total amount of at least 96.0% by weight, and most preferably in a total amount of at least 98.0% by weight, based on the total weight of the aluminum material.

In one embodiment of the present invention, the aluminum material preferably comprises aluminum (Al), scandium (Sc), zirconium (Zr) and ytterbium (Yb) in a total amount from 88.0 to 100.0% by weight, or in a total amount from 88.0 to 99.99% by weight, based on the total weight of the aluminum material. For example, the aluminum material preferably comprises aluminum (Al), scandium (Sc), zirconium (Zr) and ytterbium (Yb) in a total amount from 88.0 to 99.95% by weight, preferably from 88.0 to 99.5% by weight, and most preferably in a total amount from 88.0 to 99.45% by weight, based on the total weight of the aluminum material. In one embodiment of the present invention, the aluminum material preferably comprises aluminum (Al), scandium (Sc), zirconium (Zr) and ytterbium (Yb) in a total amount from 90.0 to 99.5% by weight, based on the total weight of the aluminum material. As an alternative, the aluminum material preferably comprises aluminum (Al), scandium (Sc), zirconium (Zr) and ytterbium (Yb) in a total amount from 98.0 to 99.95% by weight, based on the total weight of the aluminum material.

In one embodiment of the present invention, the aluminum material comprises the at least one further alloying element selected from the group consisting of Mg, Zn, Cu, Mn, Si, Li and Ag in an amount from 0.5 to 10.0% by weight per element, based on the total weight of the aluminum material. In addition or as an alternative, the aluminum material comprises the at least one further alloying element selected from the group consisting of Ti, Nb, Ta, Hf, Fe, Ni, Co, Cr and V and/or selected from the group of lanthanides comprising Y, La, Eu, Nd, Gd, Tb, Dy, Er, Pr and Ce in an amount from 0.05 to 2.0% by weight per element, based on the total weight of the aluminum material.

In one embodiment of the present invention, the aluminum material comprises aluminum (Al) in an amount from 97.375 to 99.5875% by weight, based on the total weight of the aluminum material. For example, the aluminum material comprises aluminum (Al) in an amount from 97.6 to 99.5% by weight, and preferably in an amount from 98.0 to 99.2% by weight, and further preferably in an amount from 98.4 to 99.0% by weight, based on the total weight of the aluminum material.

So as to obtain an aluminum material having high structural hardness and improved precipitation hardening, it is advantageous for the aluminum material to comprise scandium (Sc), zirconium (Zr) and ytterbium (yb) in a defined amount. For example, the aluminum material preferably comprises scandium (Sc), zirconium (Zr) and ytterbium (Yb) in an amount of less than 2.625% by weight, based on the total weight of the aluminum material. In one embodiment of the present invention, the aluminum material comprises scandium (Sc), zirconium (Zr) and ytterbium (Yb) in an amount from 0.4125 to 2.625% by weight, preferably in an amount from 0.65 to 2.1% by weight, further preferably in an amount from 0.8 to 1.8% by weight, and most preferably in an amount from 1.0 to 1.6% by weight, based on the total weight of the aluminum material.

In one embodiment of the present invention, the aluminum material comprises scandium (Sc) in an amount from 0.3 to 1.5% by weight, based on the total weight of the aluminum material. For example, the aluminum material comprises scandium (Sc) in an amount from 0.5 to 1.2% by weight, and preferably in an amount from 0.5 to 1.0% by weight, based on the total weight of the aluminum material. The addition of scandium (Sc) to the alloy in particular has the advantage that this contributes to improving the strength at room temperature.

In addition or as an alternative, the aluminum material comprises zirconium (Zr) in an amount from 0.075 to 0.75% by weight, based on the total weight of the aluminum material. For example, the aluminum material comprises zirconium (Zr) in an amount from 0.1 to 0.6% by weight, and preferably in an amount from 0.2 to 0.5% by weight, based on the total weight of the aluminum material. The addition of zirconium (Zr) to the alloy in particular has the advantage that it contributes to improving the strength at room temperature and to improving the metallurgical heat resistance, which is to say to the stabilization of the microstructure.

In one embodiment of the present invention, the aluminum material comprises ytterbium (Yb) in an amount from 0.0375 to 0.375% by weight, based on the total weight of the aluminum material. For example, the aluminum material comprises ytterbium (Yb) in an amount from 0.05 to 0.3% by weight, and preferably in an amount from 0.1 to 0.3% by weight, based on the total weight of the aluminum material. The addition of ytterbium (Yb) to the alloy in particular has the advantage that it reduces the tendency of the material to precipitate non-coherent intermetallic dispersoids as the material solidifies, and the resulting material thus becomes less critical with regard to the cooling conditions.

Another requirement of the present invention is that the weight ratio of scandium (Sc) to zirconium (Zr) to ytterbium (Yb) [Sc/Zr/Yb] is in a defined range.

So as to obtain an aluminum material having high structural hardness and improved precipitation hardening, it is necessary for the weight ratio of scandium (Sc) to zirconium (Zr) to ytterbium (Yb) [Sc/Zr/Yb] in the aluminum material to be in a range from 10/5/2.5 to 10/2.5/1.25. For example, the weight ratio of scandium (Sc) to zirconium (Zr) to ytterbium (Yb) [Sc/Zr/Yb] is in a range from 10/5/2.5 to 10/3/2, and preferably in a range from 10/5/2.5 to 10/4/2. In one embodiment of the present invention, the weight ratio of scandium (Sc) to zirconium (Zr) to ytterbium (Yb) [Sc/Zr/Yb] is approximately 10/5/2.5. Another advantage of this weight ratio of scandium (Sc) to zirconium (Zr) to ytterbium (Yb) is that components produced from the aluminum material, which is obtained using a defined heat treatment process, have lower residual component stress and high strength.

According to one embodiment of the present invention, the aluminum material has a tensile strength in a range from 350 to 800 MPa at room temperature due to the defined heat treatment. In addition or as an alternative, the aluminum material has a yield strength in a range of 350 to 800 MPa at room temperature.

In one embodiment of the present invention, the aluminum material has a tensile strength or a yield strength in a range from 350 to 800 MPa at room temperature. In a further embodiment of the present invention, the aluminum material has a tensile strength and a yield strength in a range from 350 to 800 MPa at room temperature.

In addition or as an alternative, following further heat treatment of the material in a temperature range from 300 to 400° C., the tensile strength and/or the yield strength at room temperature are higher than the tensile strength and/or yield strength of the same material produced without further heat treatment. In one embodiment of the present invention, following further heat treatment of the material in a temperature range from 300 to 400° C., the tensile strength or the yield strength at room temperature is higher than the tensile strength or yield strength of the same material produced without further heat treatment. In a further embodiment of the present invention, following further heat treatment of the material in a temperature range from 300 to 400° C., the tensile strength and the yield strength at room temperature are higher than the tensile strength and yield strength of the same material produced without further heat treatment.

The present invention also relates to a method for producing such an aluminum material. The method according to the invention for producing an aluminum material as described above comprises at least the following steps:

a) providing an aluminum (Al)-scandium (Sc)-zirconium (Zr) base alloy, b) adding ytterbium (Yb) to the AlScZr base alloy from step a) to produce a molten aluminum (Al)-scandium(Sc)-zirconium(Zr)-ytterbium (Yb) alloy, c) cooling the molten AlScZrYb alloy obtained in step b) in the temperature interval $T_{liquidus}$ to $T_{350° C.}$ at a cooling rate of ≥100 K/sec to produce a solidified AlScZrYb alloy, and d) heat treating the solidified AlScZrYb alloy in a temperature range from 250 to 500° C.

The method according to the invention is suitable for producing the above-described aluminum material, which is to say an AlScZrYb alloy, and has low manufacturing complexity and minimizes the development of residual component stresses, while maximizing strength and precipitation hardening.

One requirement of the method according to the invention is thus that an aluminum (Al)-scandium (Sc)-zirconium (Zr) base alloy is provided. The AlScZr base alloy is preferably obtained by adding zirconium (Zr) to an aluminum (Al)-scandium (Sc) base alloy.

The zirconium (Zr) is added to the AlSc base alloy by way of the method known in the prior art. For example, zirconium (Zr) is added to the AlSc base alloy in the melt. By way of this step, zirconium (Zr) can be homogeneously distributed in the AlSc base alloy.

In a further embodiment of the present invention, the AlSc base alloy is preferably obtained by adding scandium (Sc) to aluminum (Al). The scandium (Sc) is added to aluminum (Al) by way of the method known in the prior art. For example, scandium (Sc) is added to aluminum (Al) in the melt.

For manufacturing reasons, the aluminum (Al)-scandium (Sc) base alloy, or the aluminum (Al)-scandium (sc)-zirconium (Zr) base alloy, can comprise impurities of other elements.

In one embodiment of the present invention, the AlSc base alloy, or the AlScZr base alloy, comprises at least one further alloying element selected from the group consisting of Mg, Zn, Cu, Mn, Si, Li, Ag, Ti, Nb Ta, Hf, Fe, Ni, Co, Cr, V and/or at least one further alloying element selected from the group of lanthanides comprising Y, La, Eu, Nd, Gd, Tb, Dy, Er, Pr and Ce.

For example, the AlSc base alloy, or the AlScZr base alloy, comprises the at least one further alloying element selected from the group consisting of Mg, Zn, Cu, Mn, Si, Li and Ag in an amount from 0.5 to 10.0% by weight per element, based on the total weight of the AlSc base alloy, or of the AlScZr base alloy. In addition or as an alternative, the AlSc base alloy, or the AlScZr base alloy, comprises the at least one further alloying element selected from the group consisting of Ti, Nb, Ta, Hf, Fe, Ni, Co, Cr and V and/or selected from the group of lanthanides comprising Y, La, Eu, Nd, Gd, Tb, Dy, Er, Pr and Ce in an amount from 0.05 to 2.0% by weight per element, based on the total weight of the AlSc base alloy, or of the AlScZr base alloy.

If the AlSc base alloy, or the AlScZr base alloy, comprises at least one further alloying element, the AlSc base alloy, or the AlScZr base alloy, comprises the at least one further alloying element in sum in a maximal amount of 12.0% by weight, based on the total weight of the AlScZr [sic] or the AlScZr base alloy.

The AlScZr base alloy and/or the AlSc base alloy are typically provided in powder or wire form. As an alternative, the AlScZr base alloy and/or the AlSc base alloy are provided as a sintered, cast, rolled or extruded formed part.

The addition of ytterbium (Yb) to the AlScZr base alloy in step b) to produce an aluminum (Al)-scandium (Sc)-zirconium (Zr)-ytterbium (Yb) alloy is carried out by way of the method known from the prior art. For example, ytterbium (Yb) can be added to the AlScZr base alloy in the melt. By way of this step, ytterbium (Yb) can be homogeneously distributed in the AlScZr base alloy.

The molten AlScZrYb alloy in step b) can be produced by way of a variety of different heat sources. The molten AlScZrYb alloy is typically produced by way of a laser beam, an electron beam or an arc. However, it is also possible to employ a chemical, exothermic reaction, or the molten AlScZrYb alloy can be produced capacitively, conductively or inductively. It is also possible to employ any arbitrary combination of these heat sources to produce the molten AlScZrYb alloy.

One requirement of the method according to the invention is that the molten AlScZrYb alloy is subjected to defined rapid cooling to produce a solidified AlScZrYb alloy. In particular, one requirement of the present invention is that the molten AlScZrYb alloy is cooled during the temperature interval $T_{liquidus}$-$T_{350° C.}$ at a cooling rate of ≥100 K/sec. For example, the molten AlScZrYb alloy is cooled in the temperature interval $T_{liquidus}$ to $T_{350° C.}$ at a cooling rate in a range of ≥150 K/sec.

Methods for rapidly cooling molten alloys are known from the prior art. For example, the AlScZrYb alloy can be cooled in a directly cooled metal mold, using what is known as melt spinning, or in a powder atomization method, such as atomization or spraying of the melt. By way of this step, a large amount of scandium (Sc), zirconium (Zr) and ytterbium (Yb) can be maintained dissolved in the aluminum (Al), without resulting in the formation of no longer coherent intermetallic dispersoids.

In one embodiment of the present invention, the molten AlScZrYb alloy is cooled to room temperature.

Another requirement of the method according to the invention is that the solidified AlScZrYb alloy is heat-treated in a temperature range from 250 to 500° C. (step d)). Methods for heat treating aluminum alloys in a temperature range from 250 to 500° C. are known from the prior art. This heat treatment improves the material properties of the aluminum material since residual stresses in the material are reduced, and the structural hardness is increased at the same time by way of precipitation hardening.

In one embodiment of the present invention, the heat treatment according to step d) of the method according to the invention is carried out immediately after step c), which is to say the heat treatment according to step d) of the method according to the invention is carried out directly with the solidified AlScZrYb alloy obtained in step c). In other words, the method according to the invention is carried out without one or further method steps between method steps c) and d).

As an alternative, the method according to the invention is carried out with one or more further method steps between method steps c) and d). In one embodiment of the present invention, a thermomechanically processed formed part, such as an extruded formed part, is produced from the AlScZrYb alloy obtained in step c) immediately after step c). This means that in this case the heat treatment according to step d) of the method according to the invention is carried out on a thermomechanically processed formed part, such as an extruded formed part, which was produced from the solidified AlScZrYb alloy obtained in step c).

For example, the thermomechanically processed formed part is obtained by extruding the solidified AlScZrYb alloy obtained in step c). The solidified AlScZrYb alloy obtained in step c) is extruded by way of the method known from the prior art. For example, the extrusion is carried out at temperatures between 300 and 400° C. or at a temperature between 310 and 380° C. In addition or as an alternative, the extrusion is carried out at a compression ratio in a range from 20:1 to 50:1, preferably from 20:1 to 40:1, and more preferably from 20:1 to 30:1. The extrusion is carried out at a compression ratio from 20:1 to 25:1, for example. In one embodiment of the present invention, the extrusion is carried out at temperatures between 300 and 400° C. and at a compression ratio from 20:1 to 50:1, for example the extrusion is carried out at temperatures between 310 and 380° C. and a compression ratio from 20:1 to 40:1, or from 20:1 to 30:1.

In a further embodiment of the present invention, the solidified AlScZrYb alloy obtained in step c) is degassed at a temperature between 250 and 400° C. before it is extruded. For example, for this purpose the solidified AlScZrYb alloy obtained in step c) is initially mechanically comminuted to obtain granules or powder. The degassing step is thus preferably carried out with the solidified AlScZrYb alloy obtained in step c) and present in powder form. The solidified AlScZrYb alloy obtained in step c) is mechanically comminuted by way of the method that is known from the prior art. The mechanically comminuted AlScZrYb alloy can subsequently be degassed at a temperature between 250 and 400° C. For example, the degassing step is carried out at temperatures between 250 and 400° C. for a duration from 10 minutes to 5 hours, or at temperatures between 280 and 350° C. for a duration from 30 minutes to 3 hours. The degassing step can be carried out under vacuum, such as at a pressure of approximately 10-3 bar.

In one embodiment of the present invention, the heat treatment according to step d) of the method according to the invention is carried out in a temperature range from 250 to 500° C. for a duration from 10 minutes to 100 hours. The heat treatment can typically be carried out at temperatures between 250 and 450° C. for a duration from 10 minutes to 10 hours. For example, the heat treatment is carried out at temperatures between 300 and 450° C. for a duration from 10 minutes to 5 hours, or at temperatures between 300 and 400° C. for a duration from 30 minutes to 3 hours. The heat treatment can be carried out in air, protective gas or under vacuum, such as under vacuum for example. The heat treatment according to step d) of the method according to the invention can also be carried out in multiple stages and/or steps. For example, the heat treatment according to step d) of the method according to the invention is carried out in air at temperatures between 300 and 400° C. for a duration from 30 minutes to 3 hours.

So as to improve the material properties, the AlScZrYb alloy can be subjected to a further defined cooling step following the heat treatment according to step d). For example, the heat-treated AlScZrYb alloy is cooled to room temperature. In one embodiment of the present invention, the heat-treated AlScZrYb alloy is cooled to room temperature at a cooling rate of ≥10 K/sec, and preferably of ≥10 to 20 K/sec. For example, the heat-treated AlScZrYb alloy is cooled to room temperature at a cooling rate in a range of ≥20 K/sec, or in a range from 20 K/sec to 10,000 K/sec.

Such methods for cooling heat-treated alloys are known from the prior art. For example, defined, expedited rapid cooling of the heat-treated AlScZrYb alloy to room temperature can take place by way of cooling with the aid of moving air or by way of quenching in water.

While generally this is not required, a further heat treatment process carried out downstream of the heat treatment according to step d) of the method according to the invention, which is also referred to as artificial aging, can improve the material properties of the produced aluminum material even further, and in particular increase the strength and toughness thereof. In one embodiment of the present invention, at least one further heat treatment process is thus carried out following the heat treatment according to step d). For example, a further heat treatment process is carried out following the heat treatment according to step d).

This subsequent further heat treatment process, or artificial aging, can typically be carried out in air, protective gas or under vacuum in a temperature range from 300 to 400° C. for a duration from 10 minutes to 100 hours. The subsequent further heat treatment is particularly preferably carried out in air, protective gas or under vacuum in a temperature range from 320 to 380° C. for a duration from 10 minutes to 10 hours, for example from 30 minutes to 5 hours. As an alternative, the subsequent further heat treatment is carried out by way of hot isostatic pressing in a temperature range from 300 to 400° C. and in a pressure range from 100 to 10000 bar. The subsequent further heat treatment can be carried out in one or more stages and/or steps. In one embodiment of the present invention, the subsequent further heat treatment is carried out in air in a temperature range from 300 to 400° C. for a duration from 10 minutes to 10 hours, or in air in a temperature range from 320 and 380° C. for a duration from 30 minutes to 5 hours.

Moreover, the produced aluminum material can be subjected to a further cooling step (such as by quenching in water), following the subsequent further heat treatment process, which is to say the artificial aging. For example, the subsequently heat-treated AlScZrYb alloy is cooled to room temperature. In one embodiment of the present invention, the subsequently heat-treated AlScZrYb alloy is cooled to room temperature at a cooling rate of ≥10 K/sec. For example, the subsequently heat-treated AlScZrYb alloy is cooled to room temperature at a cooling rate in a range of ≥20 K/sec, or in a range from 20 K/sec to 10,000 K/sec.

Based on the advantages that the aluminum material according to the invention offers, the present invention also relates to the use of the aluminum material as a structural component or passenger compartment component in a passenger transportation vehicle. For example, the aluminum material is employed as a structural component or passenger compartment component in aircraft such as passenger airplanes, in rail-borne vehicles such as trains, or in watercraft such as passenger ships. As described above, light-weight components having low residual component stress and high strength can be obtained by way of the aluminum material according to the invention. The aluminum material in particular has improved precipitation hardening.

EXAMPLES 3 melts having the nominal compositions (in % by weight) AlSc0.8, AlSc0.8Zr0.4 and AlSc0.8Zr0.4Yb0.2 were molten from industrial 99.8% pure Al, AlSc2, AlZr5 and AlYb2 master alloys, maintained at 850° C. for 60 minutes, and then cooled to room temperature by way of melt spinning in the temperature interval $T_{liquidus}$ to $T_{350° C.}$ at a cooling rate of <0.0001 sec. The resulting thin (<100 μm), approximately 5 mm wide and endless strip was subsequently mechanically comminuted and further processed in the form of granules.

The granules obtained were then degassed in a vacuum chamber at approximately 280 to 300° C. for 60 minutes (vacuum conditions approximately 10-3 mbar) and mechanically compressed at this temperature immediately upon the degassing heat with the aid of a hydraulic press to a coarse density of at least 95 to 98% by weight, based on the density of the AlScZrYb material. These preliminary billets were then rounded off, heated in an extruding press to 320 to 325° C. or 360° C., and finally extruded at a compression ratio of 23:1 into rods having a diameter of 6 mm. The rods, which were not entirely straight, were then stretched in a controlled manner on a tensile testing machine (permanent (plastic) deformation approximately 0.3 to 0.5%, based on the clamped rod length).

So-called standard round tensile specimen (B4×20 according to DIN DIN [sic] 50125) were worked out of the rods of the 3 test alloys (3 tensile specimens per rod), and the elongation at fracture, reduction of area at fracture, tensile strength and yield strength were determined at room temperature in accordance with DIN EN ISO 6892-1. This took place in the compressed state and after a defined heat treatment (heat treatment according to method step d) of the method according to the invention) was carried out at 350° C. for 2 hours with subsequent cooling to room temperature in non-moving air, so as to inspect the precipitation hardening behavior of the 3 test alloys.

The inspection of the compositions of the 3 alloys by way of the ICP/OES method according to DIN EN ISO 11885: 2009-09 showed that the alloys had the following contents of Sc, Zr and Yb:

| | alloy | | |
|---------|-------------------|---------------------|-----------------------|
| Element | AlSc [% by weight] | AlScZr [% by weight] | AlScZrYb [% by weight] |
| Sc | 0.75 | 0.72 | 0.72 |
| Zr | 0.002 | 0.38 | 0.39 |
| Yb | <0.001 | <0.001 | 0.25 |

The % by weight information is based on the total weight of the aluminum alloy. All further alloying elements are present in the aluminum alloy at ≥0.1% by weight per element, preferably even at ≥0.01% by weight, based on the total weight of the aluminum alloy, and are thus of lesser importance.

As is apparent from FIG. 1, the ascertained characteristic values (in each case, average values from 3 tensile specimen) after the extrusion process, carried out at 320 to 350° C. without carrying out the additional defined heat treatment according to step d) of the method according to the invention, show that the strength of the AlSc alloy modified with Zr is the highest. It should be noted that the achievable strength maximum for the AlSc alloy is already exceeded after the thermal material conditioning step (which is to say the extrusion step at 320 to 325° C.) (the AlSc alloy is already slightly "over-aged"), while the strength that is achievable for the AlSc alloy additionally modified with Zr is obviously at the maximum, however the strength for the AlSc alloy additionally modified with Zr and Yb is slightly lower yet again (the AlScZrYb alloy is not yet maximally "under-aged"). The AlSc alloy additionally modified with Zr and Yb, however, has the best toughness behavior (elongation at fracture & reduction of at fracture), which is equivalent to the best compromise between microstructure and tensile strength.

If, as is shown in FIG. 2, the material extruded at a temperature of 320 to 325° C. is subjected to an additional heat treatment process (350° C. for 2 hours; corresponding to the heat treatment according to step d) of the method according to the invention), it is clearly apparent that the modification of the AlScZr alloy with a defined addition of Yb is advantageous. Now, both the AlSc alloy (without heat treatment: Rm=375 N/mm$^2$; with heat treatment: Rm=345 N/mm$^2$) and the AlScZr alloy (without heat treatment: Rm=382 N/mm$^2$; with heat treatment: Rm=360 N/mm$^2$) are "over-aged". Only the AlScZrYb alloy continues to exhibit very good and high, even slightly improved strength at room temperature (with heat treatment Rm=372 N/mm$^2$; with heat treatment: Rm=381 N/mm$^2$). The strength of the AlScZrYb alloy at room temperature is thus even 6% better than that of the AlScZr alloy, and approximately 12% better than that of the AlSc alloy, and this although the process temperatures used are now approximately 10 to 15% higher than those of the prior art.

Metallurgically, this is due to the improved, because lower, quench sensitivity and the delayed precipitation kinetics of the AlScZrYb alloy, wherein the Yb addition acts according to the invention and shifts the maximally achievable strength toward higher process temperatures. This is apparent particularly well when the extruded material, as described in the paragraph above, is subjected to a further heat treatment process. This heat treatment according to step d) of the method according to the invention was carried out in one stage at a temperature of 350° C. for 2 hours (the specimens were positioned in air in a previously heated furnace). After the 2-hour aging process at 350° C. was completed, the specimen were removed from the furnace and cooled in non-moving air, wherein the cooling process was not specifically controlled, but the cooling rate was approximately 10 to 20 K/min.

FIG. 3 shows a summarizing illustration of all the ascertained characteristic values and clearly shows the advantages of the claimed aluminum material, when the same was exposed to heat treatment as part of processing the same for forming and adjusting the strength.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing an aluminum material, the method comprising the steps:
   a) providing an aluminum (AD-scandium (Sc)-zirconium (Zr) base alloy;
   b) adding ytterbium (Yb) to the AlScZr base alloy from step a) to produce a molten aluminum (Al)-scandium (Se)-zirconium(Zr)-ytterbium (Yb) alloy;
   c) cooling the molten AlScZrYb alloy obtained in step b) in a temperature interval $T_{liquidus}$ to $T_{350° C.}$ at a cooling rate of ≥100 K/sec to produce a solidified AlScZrYb alloy; and
   d) heat treating the solidified AlScZrYb alloy in a temperature range from 250 to 500° C.,
   wherein a weight ratio of scandium (Sc) to zirconium (Zr) to ytterbium (Yb) [Sc/Zr/Yb] is in a range from 10/5/2.5 to 10/2.5/1.25.

2. The method of claim 1, wherein the AlScZr base alloy is obtained by previously adding zirconium (Zr) to an aluminum (Al)-scandium (Sc) base alloy.

3. The method of claim 1, wherein an AlScZr base alloy or an AlSc base alloy is used, which comprises at least one further alloying element selected from the group consisting of Mg, Zn, Cu, Mn, Si, Li, Ag in an amount from 0.5 to 10.0% by weight, Ti, Nb, Ta, Hf, Fe, Ni, Co, Cr, V and/or at least one further alloying element selected from the group of lanthanides comprising Y, La, Eu, Nd, Gd, Tb, Dy, Er, Pr and Ce in an amount from 0.05 to 2.0% by weight, based on the total weight of the AlScZr or AlSc base alloy, per element.

4. The method of claim 1, wherein the AlScZr base alloy and/or the AlSc base alloy are present
   a) in powder or wire form, or
   b) as sintered, cast, rolled or extruded molded parts.

5. The method of claim 1, wherein the melting of the AlScZrYb alloy in step b) is carried out
  a) by way of a laser beam, an electron beam or an arc,
  b) by way of a chemical exothermic reaction, and/or
  c) capacitively, conductively or inductively.

6. The method of claim 1, wherein the molten AlScZrYb alloy is cooled in the temperature interval $T_{liquidus}$ to $T_{350°\,C.}$ at a cooling rate of $\geq 150$ K/sec.

7. The method of claim 1, wherein the AlScZrYb alloy is cooled to room temperature.

8. The method of claim 1, wherein the heat treatment of the solidified AlScZrYb alloy is carried out for a duration from 10 minutes to 100 hours and/or takes place in multiple stages and/or steps.

9. The method of claim 1, wherein the heat-treated AlScZrYb alloy is subjected to cooling to room temperature and the cooling rate is $\geq 10$ K/sec.

10. The method of claim 1, wherein, following the heat treatment from step d), at least one further heat treatment process is carried out
  a) in air, protective gas or under vacuum in a temperature range from 300 to 400° C. for a duration from 10 minutes to 100 hours and/or in multiple stages and/or steps, or
  b) by way of hot isostatic pressing in a temperature range from 300 to 400° C. and a pressure range from 100 to 10000 bar and/or in multiple stages and/or steps.

* * * * *